Nov. 13, 1956   J. O. WELLER   2,770,286
SELF-LEVELING SEAT STRUCTURE
Filed May 29, 1953   2 Sheets-Sheet 1
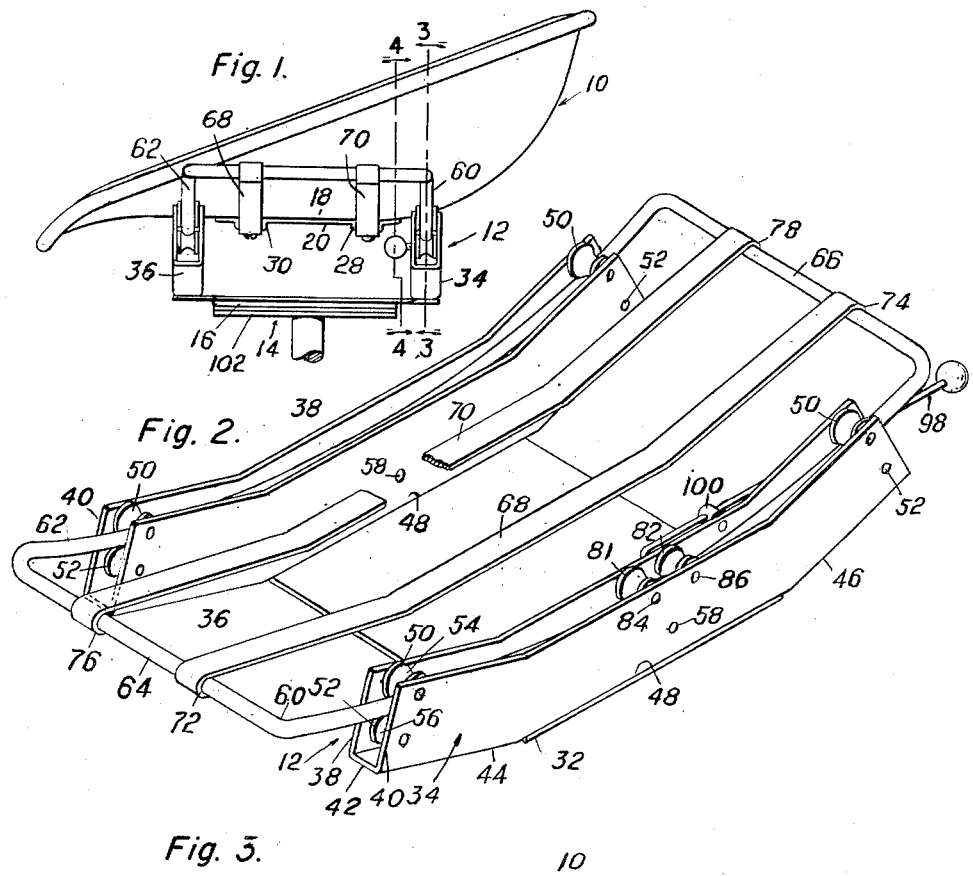
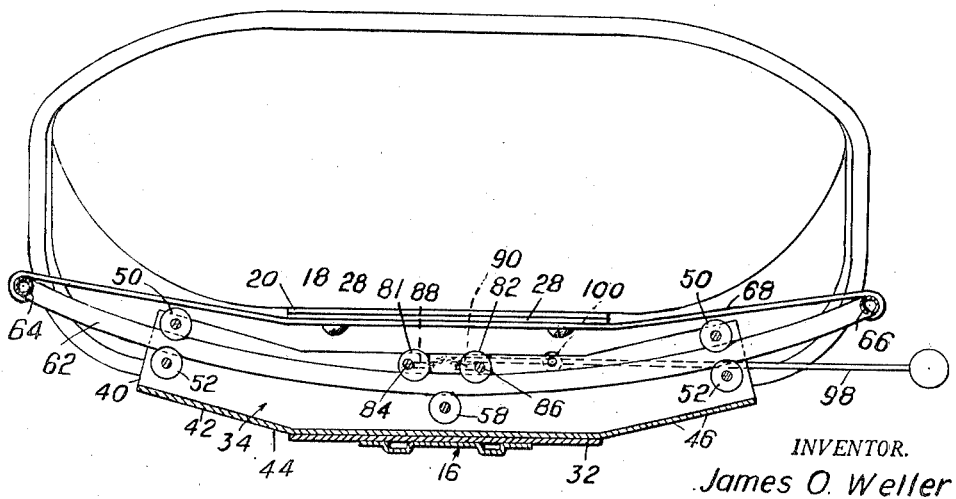
INVENTOR.
James O. Weller
BY
Shoemaker & Mattare
ATTORNEYS Nov. 13, 1956  J. O. WELLER  2,770,286
SELF-LEVELING SEAT STRUCTURE
Filed May 29, 1953  2 Sheets-Sheet 2
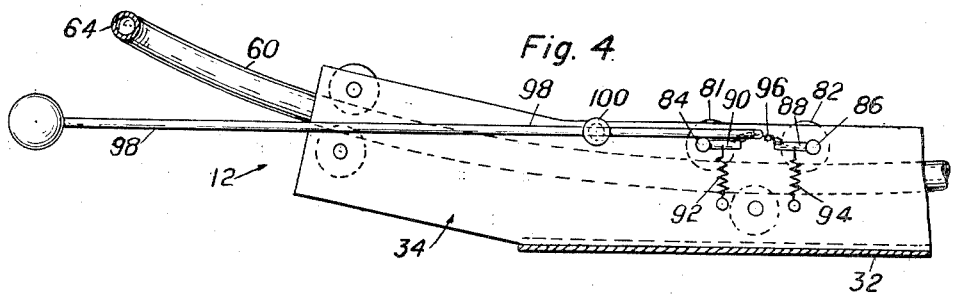
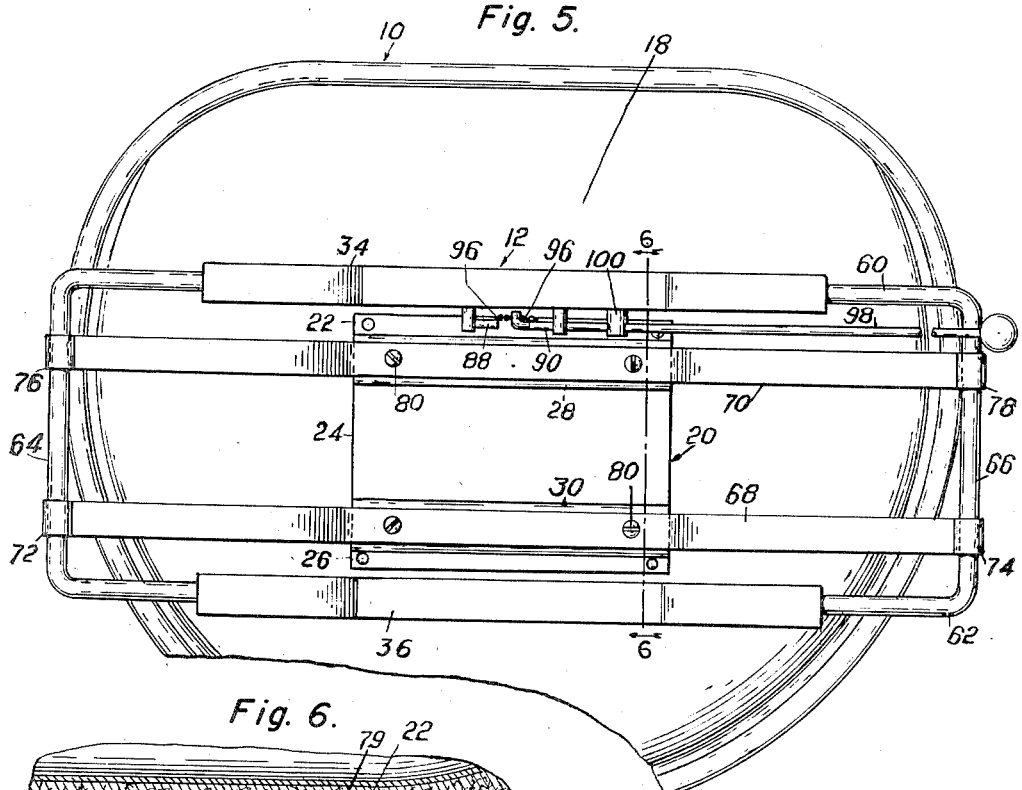
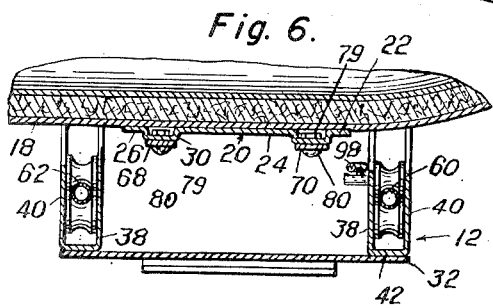
INVENTOR.
James O. Weller
BY Shoemaker & Mattare
ATTORNEYS United States Patent Office 2,770,286
Patented Nov. 13, 1956

2,770,286

SELF-LEVELING SEAT STRUCTURE

James O. Weller, Long Beach, Calif., assignor to Ernest F. Pohl, Woodside, N. Y.

Application May 29, 1953, Serial No. 358,419

12 Claims. (Cl. 155—5)

The present invention relates to an improved seat assembly for tractors and other vehicles normally traveling over rough, inclined or otherwise non-level surfaces.

In such tractors and other vehicles, a problem has existed bearing upon the comfort of the operator of the vehicle or the like. The problem is with regard to the uncomfortableness of sitting on a tractor seat while the tractor is traveling over a surface inclined transversely relative to the tractor. Whereas the operator tends to sit upright, the tractor seat tends to hold the posterior of the operator toward an inclined relationship which, of course, causes muscular aches and in general fatigues the operator of the tractor. I am aware of prior proposals to overcome the existing problem. However, such prior proposals have not come into general usage to any substantial extent for they have been either complex, insofar as tractor and like seats are concerned, and therefore expensive to manufacture or they have failed to take into consideration all of the factors involved in the problem.

It is, therefore, a primary object of the present invention to provide an improved seat assembly which will not only be simple and inexpensive in construction but which will also compensate for at least the major factors affecting the comfortability of riding in tractor seats.

A more specific object of the present invention is to provide a seat assembly which will react in response to gravity as a motivating force to tend to maintain a substantially horizontal relationship for the posterior-receiving member and yet wherein the movement of the latter member relative to its support is somewhat of a hammock-like movement rather than a pivoting movement.

A further object of the present invention is to provide an improved seat assembly wherein the freedom of movement of the posterior-receiving member relative to its supporting member is limited when there is a change in angularity of the support for the member relative to the horizontal, and wherein the freedom of movement is provided at the will of the operator by manually actuatable means.

Various other objects and advantages of my invention will become apparent from the detailed description to follow.

In its broadest aspect, my invention contemplates the use of guide rail means such as a spaced pair of guide rail sections and roller means associated with the guide rail sections for guidingly supporting a posterior-receiving member for movement along an arc of a circle the center of which is substantially above the posterior receiving member. Additionally, my invention contemplates associating with the guide rail means and roller means, cam means for limiting freedom of adjustment of the posterior-receiving member toward a horizontal relationship when angularity changes are encountered. As, for example, when traveling over rough ground, in which case the tendency to compensate for changes in angularity of the support relative to the horizontal would act, if unrestricted, to make the operator extremely uncomfortable.

In the drawings:

Fig. 1 is a side elevational view of my seat assembly showing the same mounted on a supporting standard;

Fig. 2 is an enlarged perspective view of the mechanism of the present invention including the self leveling means, the automatic locking means and the manual means for releasing the automatic locking means;

Fig. 3 is a vertical transverse sectional view taken substantially along the plane of line 3—3 of Fig. 1;

Fig. 4 is a vertical transverse sectional view taken substantially along the plane of line 4—4 of Fig. 1, part being broken away;

Fig. 5 is a bottom plan view of my seat assembly with the plate joining the channel members removed; and Fig. 6 is a vertical sectional view taken substantially along the plane of line 6—6 of Fig. 5.

Looking more particularly to the drawings, it will be seen that the seat assembly of the present invention includes a posterior-receiving member 10, self leveling and automatically restrictive means 12 for the member 10 and a seat supporting means 14 associated with a bracket 16 on the underside of the means 12.

The posterior-receiving member 10 shown is of a specific type but it will be understood that the referred to member is not my invention but may vary considerably in its form, the only requirement being for means to adapt the self-leveling and automatically restrictive means thereto. The member 10 is of the type including a metal seat plate on which a foam rubber filling is cemented, a covering of white cotton belting duck coated with Koroseal being cemented to the seat side of the filler.

For attachment of the means 12 to the substantially flat bottom surface 18 of the seat plate, there is provided a bracket 20. The bracket 20 is of substantially rectangular shape and includes attachment portions 22, 24 and 26, intermediate portions 28 and 30 thereof being offset to provide channels for a purpose to be described hereinafter. When securing the bracket to the seat plate spot weld is initially utilized at spaced points on the attachment portions 22, 24, 26 and 28 and then the bracket is fastened by rivets.

As best shown in Fig. 2, the means 12 of the present invention is mounted on a common base plate or other supporting member 32, along opposing front and rear edge portions of which are secured the channel members 34 and 36. The channel member 34 is of channeled cross-section including upstanding walls 38 and 40 and a bottom joinder wall 42, and is comprised of inclined end sections 44 and 46 and a relatively horizontal joining section 48. Adjacent each end of the channel member 34 and journaled between the upstanding walls 38 and 40 thereof is a pair of spaced rollers 50, 52 the surfaces of which are concaved at 54 and 56. In the intermediate section 48 a single centrally disposed lower roller, similar to the above rollers, is provided at 58. The several rollers described all are substantially tangential to an arcuate section of a circle. The channel member 36 is similarly constructed insofar as the foregoing is concerned and like numerals refer to like parts.

The guide rail means of the present invention includes the spaced pair of arcuate rail sections 60 and 62 joined at their ends by the joinder sections at 64 and 66, the radius of curvature of the arcuate rail sections being equal to that of the referred to circle. The rail sections 60 and 62 are formed from round metallic stock and extend between the pairs of rollers 50 and 52 and over the roller 58, the spacing of the rollers being such that the upper rollers have light contact on the upper side of each rail section while the under side of each rail section rests on the remaining rollers.

The end sections 64 and 66 are joined by the saddle straps 68 and 70 which are formed from relatively heavy resilient metallic strips welded at their ends 72, 74 and 76, 78 to the sections 64 and 66. The straps are received on the offset portions 28 and 30 above referred to in connection with the bracket on the underside of the seat plate after spot welding and riveting of the latter to the seat plate, although a different sequence of assembly operations will readily suggest itself. As seen best in Figs. 5 and 6, nuts 79 are received in said channels for cooperation with screws 80 for securing the straps 68 and 70 on the offset portions 28 and 30, other suitable means being employed if desired.

From the foregoing, it will be seen that the seat bucket will be supported by the guide rail means cooperating with the roller means in the channel members and the seat bucket with the weight of the operator thereon will by the force of gravity tend to seek a level relationship as the support for the seat bucket tends to change its angularity relative to the horizontal.

In order to limit this freedom of adjustment so that abrupt changes in the referred to angularity, as occasioned by rough ground, will not undesirably affect the operation of the present assembly, cam means is provided in at least one of the channels for cooperation with the rail section 60 therein. A pair of cams 81 and 82 are disposed in the channel member 34 and are of circular form with their cam shafts 84 and 86 fixed thereto for movement therewith. The cam shafts 84 and 86 are eccentrically located relative to the centers of the cams and are journaled in the upstanding walls 38 and 40 of the channel member 34 above and to each side of the roller 58. The cams have their surfaces concaved similar to the rollers.

The cam shafts 84 and 86 have arms 88 and 90 secured thereto and springs 92 and 94 normally urge the arms so that the cams lightly abut the contacted rail section 60. A chain link 96 loosely pivotally connects the arms 88 and 90 and a lever 98 is fixedly connected with the center of the link so as to raise the same upon pivoting of the lever 98 about its pivot at 100.

Accordingly, when traveling over rough ground, where abrupt changes in angularity of the support for the seat relative to the horizontal are encountered, the rail sections will tend to move to compensate for such abrupt change but will carry one of the cams therewith so as to jam the rail section between the cam and rollers on the opposing side of the rail section, thus preventing objectionable excessive relative sliding between the rail sections and the support therefor. Such jamming is easily manually released by lowering the handle of the lever 98 which lifts the link 96 and rotates the cam from its jamming relationship.

Thus, if the seat suport tilts to the right in Figs. 2, 3 and 4, as is the case where a tractor is traveling with wheels on one side on high ground and the opposing wheels in a furrow, the rail sections 60 and 62 will tend to move to the right between and over the rollers 50, 52 and 58. Even though the change is gradual, the rail section will tend to slide past the cams 81 and 82 and the cam 82 will partially rotate. Jamming will occur but the operator can depress the lever 98 to release the cam locking of the rails to permit adjustment. In this fashion and under normal changes in supporting surface conditions, the seat will adjust itself to proper positioning for comfort of the operator without uncomfortable pivoting movement. If abrupt changes are encountered, as over rough ground as above described, the cam 82, if the tendency is tilting to the right, will jam the rail section aginst the roller 58 after slight longitudinal movement of the rail section relative thereto.

As to the mounting of the foregoing on a conventional mounting post of a tractor, a bracket 102 similar to the above described bracket 16 is provided and secured to the underside of plate 32.

As this invention may be embodied in several forms without departing from the spirit or essential characteristics thereof, the present embodiment is therefore illustrative and not restrictive, since the scope of the invention is defined by the appended claims rather than by the description preceding them, and all change that fall within the metes and bounds of the claims or that form their functional as well as conjointly cooperative equivalents, are therefore intended to be embraced by those claims.

I claim:

1. A seat assembly for tractors and the like comprising a posterior-receiving seat member, guide rail means extending transversely of the front to rear direction of the seat member, and roller support means cooperative with said guide rail means for supporting said member for movement in said transverse direction relative to the support for the assembly along an arc of a circle in response to changes in angularity of the support relative to the horizontal, and means engaging the guide rails for limiting the freedom of adjustment in response to the said changes.

2. A seat assembly for tractors and the like comprising a posterior-receiving seat member, guide rails means, and roller means cooperative with said guide rail means for supporting said member for movement relative to the support for the assembly along an arc of a circle in response to changes in angularity of the support relative to the horizontal, said guide rail means including an arcuate rail extending transversely of the front to rear direction of the seat member, the radius of curvature of which rail is equal to the radius of said circle, the rail means being carried by the underside of said posterior-receiving member.

3. A seat assembly for tractors and the like comprising a posterior-receiving seat member, guide rail means extending transversely of the front to rear direction of the seat member, and roller means cooperative with said guide rail means for supporting said member for movement relative to the support for the assembly along an arc of a circle in response to changes in angularity of the support relative to the horizontal, said roller means including a plurality of spaced rollers, at least certain of which are located in paired relationship to receive said guide rail means therebetween, and said rollers being substantially tangential to a common arcuate portion of a circle.

4. A seat assembly for tractors and the like comprising a posterior-receiving seat member, guide rail means extending transversely of the front to rear direction of the seat member, and roller means cooperative with said guide rail means for supporting said member for movement relative to the support for the assembly along an arc of a circle in response to changes in angularity of the support relative to the horizontal, and means limiting the freedom of adjustment in either of two directions in response to the said changes, said last recited means including at least one cam normally contacting said guide rail means and on a side remote from at least part of said roller means, and said at least one cam being eccentrically mounted so as to be rotated by moving guide rail means to a squeezing relationship with the roller means on the remote side to prevent unrestricted relative movement in response to changes in angularity.

5. The seat assembly of claim 4 including resilient means normally urging said cam into seat contacting relation with said guide rail means.

6. The seat assembly of claim 4 including resilient means normally urging said cam into seat contacting relation with said guide rail means, and manually actuatable means for releasing said cam from contact with said guide rail means.

7. A seat assembly for tractors and the like comprising a posterior-receiving seat member, guide rail means, and roller means cooperative with said guide rail means for supporting said member for movement relative to the support for the assembly along an arc of a circle in response to changes in angularity of the support relative to the horizontal, said guide rail means including an arcuate rail extending transversely of the front to rear direction of the seat member, the radius of curvature of which rail is equal to the radius of said circle, the rail means being carried by the underside of said posterior-receiving member, said roller means including a plurality of spaced rollers, at least certain of which are located in paired relationship to receive said guide rail means therebetween, and said rollers being substantially tangential to a common arcuate portion of a circle.

8. A seat assembly for tractors and the like comprising a posterior-receiving member, guide rail means, and roller means cooperative with said guide rails means for supporting said member for movement relative to the support for the assembly along an arc of a circle in response to changes in angularity of the support relative to the horizontal, and means limiting the freedom of adjustment in response to the said changes, said guide rail means including an arcuate rail extending transversely of the front to rear direction of the seat member, the radius of curvature of which rail is equal to the radius of said circle, the rail means being carried by the underside of said posterior-receiving member, said roller means including a plurality of spaced rollers, at least certain of which are located in paired relationship to receive said guide rail means therebetween, and said rollers being substantially tangential to a common arcuate portion of a circle.

9. A seat assembly for tractors and the like comprising a posterior-receiving seat member, guide rail means, and roller means cooperative with said guide rail means for supporting said member for movement relative to the support for the assembly along an arc of a circle in response to changes in angularity of the support relative to the horizontal, said guide rail means including a spaced pair of arcuately parallel rail sections extending transversely to the front to rear direction of the seat member and having their ends joined by transverse sections, and straps connecting said transverse sections and attached to the underside of said posterior-receiving member.

10. A seat assembly for tractors and the like comprising a posterior-receiving seat member, guide rail means, and roller means cooperative with said guide rail means for supporting said member for movement relative to the support for the assembly along an arc of a circle in response to changes in angularity of the support relative to the horizontal, said guide rail means including a spaced pair of arcuately parallel rail sections extending transversely to the front to rear direction of the seat member and having their ends joined by transverse sections, and straps connecting said transverse sections and attached to the underside of said posterior-receiving member, said roller means including a spaced pair of generally longitudinally arcuate channel members adapted to receive said parallel rail sections therein, and rollers journaled in said channel members above and below the same.

11. The seat assembly of claim 4 including resilient means normally urging said cam into contacting relation with said guide rail means, and manually actuatable means for releasing said cam from contact with said guide rail means, wherein said last recited means includes a hand operated lever and linkage means connected with said cam.

12. A seat assembly for tractors and the like comprising a posterior-receiving seat member, guide rail means, and roller means cooperative with said guide rail means for supporting said member for movement relative to the support for the assembly along an arc of a circle in response to changes in angularity of the support relative to the horizontal, and means limiting the freedom of adjustment in response to the said changes, said last recited means including a pair of spaced eccentric cams operatively engaging said guide rail means for holding the same against movement in either of two longitudinal directions, and manually actuatable means for selectively releasing said cams from contact with said guide rail means.

References Cited in the file of this patent
UNITED STATES PATENTS

| | | |
|---|---|---|
| 383,868 | Davey | June 5, 1888 |
| 1,196,371 | Lattig | Aug. 29, 1916 |
| 1,275,825 | Allen | Aug. 13, 1918 |
| 1,390,506 | Carter | Sept. 13, 1921 |
| 1,807,451 | Stebbins | May 26, 1931 |
| 1,923,853 | Van Duyn | Aug. 22, 1933 |
| 1,964,405 | Nenne | June 26, 1934 |
| 2,284,352 | Zank | May 26, 1942 |
| 2,352,358 | Andersen | June 27, 1944 |
| 2,569,730 | O'Donnell | Oct. 2, 1951 |

FOREIGN PATENTS

| | | |
|---|---|---|
| 243,763 | Switzerland | Feb. 1, 1947 |
| 327,439 | Great Britain | Apr. 7, 1930 |